Aug. 13, 1963   H. BRÖMER ETAL   3,100,714
OPTICAL CROWN GLASSES
Filed Oct. 3, 1961
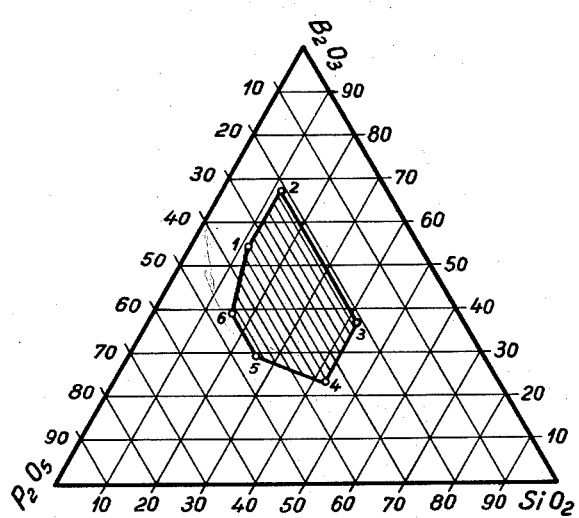
INVENTORS
Heinz Brömer
Norbert Meinert
BY
Benj. T. Rauber
attorney

United States Patent Office 3,100,714  
Patented Aug. 13, 1963

3,100,714  
OPTICAL CROWN GLASSES  
Heinz Brömer and Norbert Meinert, Wetzlar (Lahn), Germany, assignors to Ernst Leitz, G.m.b.H., Wetzlar (Lahn), Germany  
Filed Oct. 3, 1961, Ser. No. 142,551  
Claims priority, application Germany Nov. 5, 1960  
7 Claims. (Cl. 106—54)

Our invention relates to optical glasses which lie in the range of strong to strongest crown glasses.

Recently the application of lanthanum crown glasses for objectives of high value has attained increasing importance, yet in the preparation of normal objectives recently, as formerly, strong and strongest crown glasses have been used predominantly. These two types of glasses were, until the present time, melted down on a silicate base with partial substitution of boric oxide and very high proportions of alkaline earth metals, principally barium oxide. The majority of these glasses is strongly sensitive to spotting and, in fabrication, produce a high quota of rejects.

Most recently the tendency is to use phosphoric oxide as a base glass with the addition of boric oxide. The glasses thus melted down are essentially resistant to chemical attack and spotting but have the disadvantage that they incline very easily in commercial production to crystallization. In some types the production of pressings and "gob" by this means is not possible.

By means of systematic stabilizing reasearch it has been found that all of these obstacles can be obviated if one selects as a glass base a ternary combination consisting of silica, boric oxide and phosphoric oxide. In this formation of a glass base one uses, besides other oxides, larger amounts of oxides of the alkaline earth metals with the exception of beryllium and radium and obtains glasses which are essentially more stable than the original silicate glasses and which do not exhibit the tendency to crystallation of the phosphate glasses.

The glasses of the above invention have as a glass forming base a combination of silica, boric oxide and phosphoric oxide within the following limits:

|  | Percent by weight |
|---|---|
| $SiO_2$ | 5.5 to 20.0 |
| $B_2O_3$ | 10.0 to 31.5 |
| $P_2O_5$ | 10.0 to 16.0 |

At the same time the sum of the three ingredients is to be between 35 and 47% by weight of the finished glass.

In the accompanying diagram the claimed field of the ternary combination, $SiO_2$—$B_2O_3$—$P_2O_5$, extended to 100% by weight of these three ingredients is shown. The corner points of the hatched field have the following values.

(1) $SiO_2$=11.7    $B_2O_3$=54.3    $P_2O_5$=34.0  
(2) $SiO_2$=11.7    $B_2O_3$=67.0    $P_2O_5$=21.3  
(3) $SiO_2$=42.5    $B_2O_3$=36.2    $P_2O_5$=21.3  
(4) $SiO_2$=42.5    $B_2O_3$=23.5    $P_2O_5$=34.0  
(5) $SiO_2$=25.7    $B_2O_3$=28.6    $P_2O_5$=45.7  
(6) $SiO_2$=15.7    $B_2O_3$=38.6    $P_2O_5$=45.7

The total content of the glasses consists of the above mentioned glass formers and the oxides of the alkaline earth metals, magnesium, calcium, strontium and barium. The amount of calcium oxide should be at least 5% by weight, the amount of barium oxide at least 20% by weight.

For the determination of special optical values, the alkaline earth oxides can be substituted partially within the given limits by the following oxides, whereby, however, the given limits for the calcium- and barium-oxide portions remain constant:

|  | Percent by weight |
|---|---|
| ZnO and/or CdO | 0 to 15.0 |
| $Al_2O_3$ | 0 to 10.0 |
| $La_2O_3$ | 0 to 7.0 |
| $ZrO_2$ | 0 to 16.0 |
| PbO | 0 to 7.5 |
| $TiO_2$ | 0 to 7.5 |
| $Ta_2O_5$ and/or $Nb_2O_5$ | 0 to 7.5 |
| $WO_3$ | 0 to 7.5 |

The sum of the substitute oxides can amount to 32.5% by weight.

It is appropriate to add the phosphoric oxide entirely or at least in part in the form of boron phosphate, meta-, pyro- and ortho-phosphates of the alkaline earths as well as of zinc and/or cadmium.

In Table 1 are examples of compositions of strong crown glasses according to the invention in percent by weight.

*Table 1*

| Melt No. | A/Br 1 | A/Br 8 | C/N/A9 | C/N/Br 1 |
|---|---|---|---|---|
| $SiO_2$ | 10.0 | 10.0 | 11.2 | 10.0 |
| $B_2O_3$ | 15.0 | 17.0 | 17.0 | 15.1 |
| $BPO_4$ | 15.0 | 15.0 | 16.8 | 14.9 |
| MgO |  |  | 10.0 | 3.0 |
| CaO | 10.9 | 18.9 | 12.9 | 9.2 |
| BaO | 27.5 | 23.5 | 27.5 | 29.5 |
| ZnO | 10.0 | 4.0 | 4.6 | 13.7 |
| $Al_2O_3$ | 7.0 | 7.0 |  | 5.0 |
| $ZrO_2$ | 4.6 | 4.6 |  | 4.6 |
| $n_e$ | 1.6352 | 1.6291 | 1.6278 | 1.6403 |
| $v_e$ | 55.4 | 56.6 | 58.7 | 54.8 |

| Melt No. | C/N/A11 | C/N/A12 | C/N/A13 |
|---|---|---|---|
| $SiO_2$ | 11.5 | 11.5 | 10.0 |
| $B_2O_3$ | 18.5 | 18.5 | 10.0 |
| $BPO_4$ | 17.0 | 17.0 | 15.0 |
| MgO | 10.0 | 10.0 | 2.5 |
| CaO | 10.5 | 8.0 | 5.0 |
| SrO | 5.0 | 5.0 | 7.5 |
| BaO | 27.5 | 27.5 | 50.8 |
| CdO |  | 2.5 |  |
| $n_o$ | 1.6199 | 1.6182 | 1.6460 |
| $v_e$ | 60.2 | 59.7 | 56.0 |

| Melt No | C/N/Br 2 | A/Br 17 | B/Br 4 | B/Br 14 |
|---|---|---|---|---|
| $SiO_2$ | 10.0 | 10.0 | 9.9 | 5.5 |
| $B_2O_3$ | 15.1 | 17.0 | 15.0 | 17.0 |
| $BPO_4$ | 14.9 | 15.0 | 14.7 | 22.5 |
| CaO | 9.2 | 18.9 | 13.5 | 12.9 |
| SrO | 7.5 |  |  |  |
| BaO | 20.0 | 23.5 | 36.2 | 27.5 |
| ZnO | 13.7 | 4.0 |  | 5.0 |
| $Al_2O_3$ | 5.0 | 2.0 | 6.7 | 2.0 |
| $La_2O_3$ |  | 5.0 |  |  |
| $ZrO_2$ | 4.6 | 4.6 | 4.0 | 7.6 |
| $n_e$ | 1.6419 | 1.6538 | 1.6369 | 1.6389 |
| $v_e$ | 55.0 | 55.5 | 56.8 | 56.2 |

| Melt No. | E/Br 10 | E/Br 11 |
|---|---|---|
| $SiO_2$ | 12.0 | 12.0 |
| $B_2O_3$ | 17.7 | 17.7 |
| $BPO_4$ | 14.9 | 14.9 |
| CaO | 4.6 |  |
| SrO | 7.1 | 9.2 |
| BaO | 36.2 | 36.2 |
| ZnO | 5.0 | 5.0 |
| $Al_2O_3$ | 2.5 | 3.5 |
| $ZrO_2$ |  | 1.5 |
| $n_e$ | 1.6229 | 1.6184 |
| $v_e$ | 60.0 | 59.1 |

In Table 2 are shown two examples in which the phosphoric oxide is substituted as metaphosphate.

Table 2

| Melt No. | A/Br 12 | A/Br 13 |
|---|---|---|
| $SiO_2$ | 10.0 | 12.0 |
| $B_2O_3$ | 22.0 | 19.1 |
| $Ca(PO_3)_2$ | 13.9 | 13.9 |
| CaO | 9.0 | 9.0 |
| BaO | 27.5 | 27.5 |
| ZnO | 6.0 | 4.0 |
| $ZrO_2$ | 4.6 | 7.5 |
| $Al_2O_3$ | 7.0 | 7.0 |
| $n_e$ | 1.6298 | 1.6344 |
| $v_e$ | 56.5 | 55.4 |

Table 3 contains a collocation of melts whose optical values lie in the region of the strongest crown glasses.

Table 3

| Melt No. | C/N/A7 | A/Br 14 | A/Br 15 | A/Br 16 |
|---|---|---|---|---|
| $SiO_2$ | 11.2 | 10.0 | 10.0 | 10.0 |
| $B_2O_3$ | 17.0 | 17.0 | 17.0 | 17.0 |
| $BPO_4$ | 16.8 | 15.0 | 15.0 | 15.0 |
| CaO | 12.9 | 18.9 | 18.9 | 18.9 |
| BaO | 27.5 | 23.5 | 23.5 | 23.5 |
| ZnO | 3.0 | 4.0 | 4.0 | 4.0 |
| PbO | 7.0 | | | |
| $Al_2O_3$ | | 2.0 | 2.0 | 2.0 |
| $ZrO_2$ | 4.6 | 4.6 | 4.6 | 4.6 |
| $TiO_2$ | | | | 5.0 |
| $WO_3$ | | 5.0 | | |
| $Ta_2O_5$ | | | 5.0 | |
| $n_e$ | 1.6521 | 1.6500 | 1.6537 | 1.6737 |
| $v_e$ | 52.9 | 54.3 | 54.4 | 48.2 |

| Melt No. | B/Br 18 | D/Br 5 | D/Br 7 | D/Br 8 |
|---|---|---|---|---|
| $SiO_2$ | 5.5 | 14.0 | 12.5 | 12.5 |
| $B_2O_3$ | 17.0 | 7.0 | 8.5 | 8.0 |
| $BPO_4$ | 22.5 | 15.0 | 15.0 | 15.0 |
| CaO | 2.9 | 7.7 | 5.0 | 9.2 |
| BaO | 27.5 | 27.5 | 27.5 | 27.5 |
| ZnO | | 13.7 | 13.7 | 13.7 |
| PbO | | 6.0 | 4.0 | 4.5 |
| $Al_2O_3$ | | 5.0 | 9.2 | 5.0 |
| $ZrO_2$ | 14.6 | 4.6 | 4.6 | 4.6 |
| $n_e$ | 1.6559 | 1.6576 | 1.6414 | 1.6588 |
| $v_e$ | 53.6 | 49.9 | 51.7 | 50.8 |

For the melting down of colorless optical glasses according to the invention raw materials of high purity grade are intimately mixed and the mix is melted in a crucible.

According to the invention there can be added to the glasses in the customary manner small portions for decolorizer, for example, arsenic oxide or antimony oxide.

Platinum is to be used as a crucible material although crucibles of otherwise usable materials can also be used.

The melting temperature lies between 1300° C. and 1400° C. The melt is stirred as in the usual manner for homogenizing.

The pouring temperature can be so chosen that the necessary viscosity for the particular casting method has been reached. It can be cast equally well according to the old method or according to modern belt casting methods. The transformation zone of the glasses lies, always according to the composition, between about 550° and 600° C.

The following Table 4 shows the chemical stability of each of two glasses of the same optical position. In it are A1 and A2 usual glasses of comerce while B1 and B2 are glasses according to the above invention. The tests were carried through according to H. Bredow, Glas-Email-Keramo-Technik 10 (1959), vol. 8, pages 297–299.

Table 4

| A1 | B1 (C/N/A5) | A2 | B2 (E/Br10) |
|---|---|---|---|
| $n_e=1.6413$. | $n_e=1.6414$. | $n_e=1.6229$. | $n_e=1.6229$. |
| $v_e=55.24$. | $v_e=54.85$. | $v_e=60.1$. | $v_e=60.0$. |
| n/10 $HNO_3$, 329.0 mg. | n/10 $HNO_3$, 164 mg. | n/10 $HNO_3$, 397 mg. | n/10 $HNO_3$, 109 mg. |
| Standard acetate, 254.0 mg. | Standard acetate, 114.0. | Standard acetate, 293.0 mg. | Standard acetate, 74 mg. |
| $SiO_2$, 30.0% by weight. | $SiO_2$, 10.0% by weight. | $SiO_2$, 30.0% by weight. | $SiO_2$, 12.0% by weight. |
| $B_2O_3$, 15.0% by weight. | $B_2O_3$, 15.1% by weight. | $B_2O_3$, 18.8% by weight. | $B_2O_3$, 17.7% by weight. |
| BaO, 48.0% by weight. | $BPO_4$, 14.9% by weight. | CaO / 4SrO } 2.0% by weight. | $BPO_4$, 14.9% by weight. |
| $Na_2O$, $Al_2O_3$, ZnO, $TiO_2$ } 7.0% by weight. | CaO, 9.2% by weight. BaO, 27.5% by weight. ZnO, 13.7% by weight. $Al_2O_3$, 5.0% by weight. $ZrO_2$, 4.6% by weight. | BaO, 47.6% by weight. $Al_2O_3$, 1.6% by weight. | CaO, 4.6% by weight. BaO, 36.2% by weight. SrO, 7.1% by weight. ZnO, 5.0% by weight. $Al_2O_3$, 2.5% by ewight. |

Having described our invention, we claim:

1. Optical glass having an index of refraction $n_e$ above 1.61 and an Abbé number $v_e$ above 48.2 and consisting essentially of, (1) 35 to 47 percent by weight of silica, boric oxide and phosphoric oxide of which the silica content lies between 5.5 and 20 percent by weight, the boric oxide between 10.0 and 31.5 percent by weight and the phosphoric oxide between 10 and 16 percent by weight and (2) the balance of 65 to 53 percent consists essentially of oxides selected from the group consisting of magnesium oxide, calcium oxide, strontium oxide and barium oxide of which balance calcium oxide is present in amount equal to at least 5 percent by weight of the glass composition and barium oxide is present in amount equal to at least 20 percent by weight of the glass composition.

2. Optical glass according to claim 1 in which the oxide (2) is substituted up to an amount of 32.5 percent by weight by the following oxides within the above stated limits:

|  | Percent by weight |
|---|---|
| ZnO and/or CdO | 0 to 15.0 |
| $Al_2O_3$ | 0 to 10.0 |
| $La_2O_3$ | 0 to 7.0 |
| $ZrO_2$ | 0 to 16.0 |
| PbO | 0 to 7.5 |
| $TiO_2$ | 0 to 7.5 |
| $Ta_2O_5$ and/or $Nb_2O_5$ | 0 to 7.5 |
| $WO_3$ | 0 to 7.5 |

3. Optical glass according to claim 1 in which the phosphoric oxide is introduced into the composition at least in part in the form of boron phosphate.

4. Optical glass according to claim 1 in which the phosphoric oxide is introduced into the composition at least in part in the form of a phosphate of an alkaline earth metal.

5. Optical glass according to claim 2 in which the phosphoric oxide is introduced into the composition at least in part in the form of a phosphate of zinc.

6. Optical glass according to claim 2 in which the phosphoric oxide is introduced into the composition at least in part in the form of a phosphate of cadmium.

7. Optical glass according to claim 1 in which an oxide of the group consisting of arsenic oxide and antimony oxide is introduced into the composition.

References Cited in the file of this patent

UNITED STATES PATENTS

| | | |
|---|---|---|
| 2,532,386 | Armistead | Dec. 5, 1950 |
| 2,615,817 | Stanworth | Oct. 28, 1952 |
| 3,009,819 | Geffcken et al. | Nov. 21, 1961 |